United States Patent
Shingo et al.

(10) Patent No.: US 6,611,559 B1
(45) Date of Patent: Aug. 26, 2003

(54) APPARATUS AND METHOD OF DETECTING MOTION VECTORS BY CALCULATING A CORRELATION DEGREE BETWEEN EACH CANDIDATE BLOCK

(75) Inventors: Takaaki Shingo, Osaka (JP); Akihiko Otani, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/934,137

(22) Filed: Sep. 19, 1997

(30) Foreign Application Priority Data

Sep. 24, 1996 (JP) .............................. 8-251086
Jun. 17, 1997 (JP) .............................. 9-159808

(51) Int. Cl.[7] .............................................. H04N 7/12
(52) U.S. Cl. ............................................. 375/240.16
(58) Field of Search ................ 348/699; 375/240.01, 375/240.12, 240.16, 240.23, 240.24; H04N 7/12

(56) References Cited

U.S. PATENT DOCUMENTS 5,400,087 A * 3/1995 Uramoto et al. ............ 348/699

FOREIGN PATENT DOCUMENTS

| JP | 61056587 A | 3/1986 |
| JP | 06030399 | 4/1994 |
| JP | 7-240923 | 9/1995 |

OTHER PUBLICATIONS

"Motion Compensation Interframe Coding For Minimizing Quantity of Transfer Information", 1176, Institute of Electronic And Communication Engineers, National Conference, Apr., 1993, pp 5–47, and English translation thereof.
Notice of Reasons for Rejection, Mar. 2, 1999, Japan.

* cited by examiner

Primary Examiner—Young Lee
(74) Attorney, Agent, or Firm—McDermott, Will & Emery

(57) ABSTRACT

In order to realize a picture compression processing with a higher efficiency than ever in motion vector detection for motion picture compression coding, an improvement is provided to motion vector selection process when a plurality of candidate blocks having evaluation values of the same correlation degree have been detected from a search area. When there are a plurality of candidate blocks within the search area which have the highest correlation degree with the coding block, a difference is calculated between each of a plurality of motion vectors corresponding to the plurality of candidate blocks, respectively, and the best motion vector which is variable-coded immediately before the best motion vector which is being determined. Based on the calculated difference, the best motion vector is selected from among the plurality of motion vectors. Consequently, when the variable coding of a motion vector string is conducted by variable-coding the difference between two consecutive motion vectors, a motion vector is selected so that the code length of the motion vector string which has been variable-coded becomes short. As a result, an efficient picture compression processing can be realized.

2 Claims, 12 Drawing Sheets

Fig. 5

|     | -3 | -2 | -1 | 0 | 1 | 2 | 3 |
|-----|----|----|----|---|---|---|---|
| -3  | 1 | 1 | 1 | 1 | 1 | 1 | 1 |
| -2  | 1 | 2 | 2 | 2 | 2 | 2 | 1 |
| -1  | 1 | 2 | 3 | 3 | 3 | 2 | 1 |
| 0   | 1 | 2 | 3 | 4 | 3 | 2 | 1 |
| 1   | 1 | 2 | 3 | 3 | 3 | 2 | 1 |
| 2   | 1 | 2 | 2 | 2 | 2 | 2 | 1 |
| 3   | 1 | 1 | 1 | 1 | 1 | 1 | 1 |

Fig. 7

|   | -3 | -2 | -1 | 0 | 1 | 2 | 3 |
|---|----|----|----|---|---|---|---|
| -3 | 1 | 2 | 3 | 4 | 3 | 2 | 1 |
| -2 | 2 | 5 | 6 | 7 | 6 | 5 | 2 |
| -1 | 3 | 6 | 8 | 9 | 8 | 6 | 3 |
| 0 | 4 | 7 | 9 | 10 | 9 | 7 | 4 |
| 1 | 3 | 6 | 8 | 9 | 8 | 6 | 3 |
| 2 | 2 | 5 | 6 | 7 | 6 | 5 | 2 |
| 3 | 1 | 2 | 3 | 4 | 3 | 2 | 1 |

PRIOR ART

Fig. 12
PRIOR ART

|    | -7 | -6 | -5 | -4 | -3 | -2 | -1 | 0  | 1  | 2  | 3  | 4  | 5  | 6  | 7  |
|----|----|----|----|----|----|----|----|----|----|----|----|----|----|----|----|
| -7 | 1  | 2  | 3  | 4  | 5  | 6  | 7  | 8  | 7  | 6  | 5  | 4  | 3  | 2  | 1  |
| -6 | 2  | 3  | 4  | 5  | 6  | 7  | 8  | 9  | 8  | 7  | 6  | 5  | 4  | 3  | 2  |
| -5 | 3  | 4  | 5  | 6  | 7  | 8  | 9  | 10 | 9  | 8  | 7  | 6  | 5  | 4  | 3  |
| -4 | 4  | 5  | 6  | 7  | 8  | 9  | 10 | 11 | 10 | 9  | 8  | 7  | 6  | 5  | 4  |
| -3 | 5  | 6  | 7  | 8  | 9  | 10 | 11 | 12 | 11 | 10 | 9  | 8  | 7  | 6  | 5  |
| -2 | 6  | 7  | 8  | 9  | 10 | 11 | 12 | 13 | 12 | 11 | 10 | 9  | 8  | 7  | 6  |
| -1 | 7  | 8  | 9  | 10 | 11 | 12 | 13 | 14 | 13 | 12 | 11 | 10 | 9  | 8  | 7  |
| 0  | 8  | 9  | 10 | 11 | 12 | 13 | 14 | 15 | 14 | 13 | 12 | 11 | 10 | 9  | 8  |
| 1  | 7  | 8  | 9  | 10 | 11 | 12 | 13 | 14 | 13 | 12 | 11 | 10 | 9  | 8  | 7  |
| 2  | 6  | 7  | 8  | 9  | 10 | 11 | 12 | 13 | 12 | 11 | 10 | 9  | 8  | 7  | 6  |
| 3  | 5  | 6  | 7  | 8  | 9  | 10 | 11 | 12 | 11 | 10 | 9  | 8  | 7  | 6  | 5  |
| 4  | 4  | 5  | 6  | 7  | 8  | 9  | 10 | 11 | 10 | 9  | 8  | 7  | 6  | 5  | 4  |
| 5  | 3  | 4  | 5  | 6  | 7  | 8  | 9  | 10 | 9  | 8  | 7  | 6  | 5  | 4  | 3  |
| 6  | 2  | 3  | 4  | 5  | 6  | 7  | 8  | 9  | 8  | 7  | 6  | 5  | 4  | 3  | 2  |
| 7  | 1  | 2  | 3  | 4  | 5  | 6  | 7  | 8  | 7  | 6  | 5  | 4  | 3  | 2  | 1  |

APPARATUS AND METHOD OF DETECTING MOTION VECTORS BY CALCULATING A CORRELATION DEGREE BETWEEN EACH CANDIDATE BLOCK

BACKGROUND OF THE INVENTION

The present invention relates to an apparatus and method of detecting motion vectors used for motion compensation coding in motion picture compression, and more specifically to a process of selecting a motion vector when there are a plurality of candidate blocks which have the same correlation degree with a coding block.

In order to transmit and store motion picture signals via communication lines with small capacities, a picture compression technique is essential to reduce huge amount of data for picture signals.

Generally, picture signals have a high level of data redundancy and a lot of information which can be reduced. One method of realizing the picture compression of motion picture signals by eliminating such reducible information to decrease the level of data redundancy is an interframe predictive coding system. An interframe prediction refers to a prediction with the use of pixels in an immediately preceding frame or in a further previous frame. According to the interframe predictive coding system, a high level of picture compression is possible for motion pictures having a small movement; however, great effects cannot be expected for motion pictures having a large movement because of a low correlation degree between frames.

In order to solve such a drawback of the interframe predictive coding system, a motion compensation interframe predictive coding system with motion vectors is available. The motion vectors used in the motion compensation interframe predictive coding system are usually detected by a block matching method. According to the block matching method, as shown in FIG. 11, the correlation degree is evaluated between a coding block consisting of (M×N) pixels within a current frame (a coding frame) and each candidate block consisting of (M×N) pixels in a search area which is set within a reference frame different in time from the current frame. The evaluation value of the correlation degree can be determined, for example, by cumulating the absolute value of the difference between the value of a pixel in a coding block and the value of the corresponding pixel in a candidate block. The displacement between the candidate block which has the smallest evaluation value of the determined correlation degree and the coding block which is reflected on the reference frame is detected as a motion vector.

In such a block matching method, more than one candidate block within a search area may possibly have the same evaluation value, so that it is necessary to select one from among the candidate blocks having the same evaluation value, so as to determine the best motion vector.

One conventional selection method for such a case is to previously assign a higher priority to a motion vector having a smaller sum of the absolute values of the horizontal and vertical components, and to compare the assigned priorities so as to determine the best motion vector when more than a plurality of motion vectors have the same smallest evaluation value (Japanese Laid-open Patent Application No. 6-30399). FIG. 12 shows the priority values for the motion vector detection in accordance with this conventional method. The numbers at the top and leftmost indicate the horizontal and vertical components of the motion vectors, respectively. The number in each square indicates priority assigned to a motion vector whose horizontal and vertical components are shown at the top and leftmost, respectively According to the conventional motion vector detection method, the best motion vector is selected in accordance with the above-mentioned priority; however, motion vectors are consecutively variable-coded, so that there is no guarantee that a motion vector whose code length becomes short when a motion vector string has been variable-coded is selected.

In the variable coding of the motion vector string, when the difference between two consecutive motion vectors is variable-coded, the conventional motion vector detection method does not enable a motion vector whose code length becomes short to be selected, which fails to realize an efficient picture compression processing.

In addition, the conventional motion vector detection method requires a means for storing the above-mentioned priorities, which causes an increase in the circuit scale. Furthermore, in order to make a selection index for selecting the best motion vector be calculated every time the best motion vector is selected, instead of assigning priorities to motion vectors in advance, it is necessary to perform a troublesome calculation of adding the absolute values of the horizontal and vertical components of motion vectors every time a motion vector is selected, which also causes an increase in the circuit scale.

SUMMARY OF THE INVENTION

The present invention has an object of realizing a more efficient picture compression processing than ever in motion vector detection for motion picture compression coding, which improves the process of selecting a motion vector when a plurality of candidate blocks having the same evaluation value of the correlation degree have been detected from a search area.

To be more specific, the motion vector detection method in accordance with the present invention comprises the steps of detecting a candidate block, which has the highest correlation degree with a coding block in a coding frame picture, from a search area within a reference frame picture; determining that a motion vector which corresponds to the candidate block is a best motion vector; and when there are a plurality of candidate blocks having the highest correlation degree with the coding block within the search area, converting a plurality of motion vectors corresponding to the plurality of candidate blocks into variable codes, based on a predetermined coding system and selecting, as a best motion vector, a motion vector whose variable code obtained as a result of conversion has the shortest code length.

According to the above-mentioned motion vector detection method, when there are a plurality of candidate blocks having the highest correlation degree with the coding block within the search area, the motion vectors corresponding to these candidate blocks, respectively, are converted into variable codes based on a predetermined coding system used in the actual transmission or another system, and the motion vector whose variable code obtained as the result of conversion has the shortest code length is selected as the best motion vector. Consequently, the code length of the variable-coded best motion vector string becomes shorter, realizing an efficient picture compression processing.

Another motion vector detection method in accordance with the present invention comprises the steps of detecting a candidate block, which has the highest correlation degree with a coding block in a coding frame picture, from a search area within a reference frame picture; determining that a motion vector which corresponds to the candidate block is a best motion vector; and when there are a plurality of candidate blocks having the highest correlation degree with the coding block within the search area, using the largest one of absolute values of components of a motion vector as a selection index and selecting, as a best motion vector, a motion vector having the smallest selection index from among a plurality of motion vectors corresponding to the plurality of candidate blocks.

According to the above-mentioned motion vector detection method, in the variable coding of a best motion vector string, the smaller the absolute value of each component of the best motion vector is, the shorter its variable code becomes in many cases. Therefore, by selecting, as the best motion vector, a motion vector whose largest absolute value for its components, which is the selection index, is the smallest, a motion vector having a shorter variable code is selected as the best motion vector in most cases. As a result, when the best motion vector string is variable-coded, the code length becomes shorter. Furthermore, the addition of the absolute values of the components of a motion vector becomes unnecessary, which realizes motion vector detection with a smaller circuit scale than ever.

In selecting the best motion vector in accordance with the above-mentioned motion vector detection method, when there are a plurality of motion vectors having the smallest selection index, it is preferable that one absolute value among the absolute values of the components of a motion vector which has not been used as the selection index is used as a new selection index, and of the plurality of motion vectors having the smallest selection index, a motion vector having the smallest new selection index is selected as the best motion vector.

According to this, when there are a plurality of motion vectors having the smallest value of the selection index, the motion vector having the smallest new selection index, that is, one of the absolute values of the components of a motion vector which has not been used as the selection index is selected as a best motion vector. Therefore, a motion vector having a shorter variable code is selected as the best motion vector in most cases. As a result, when the best motion vector string is variable-coded, the code length becomes shorter, and accordingly, the priority in selecting motion vectors can be set further minutely.

Another motion vector detection method in accordance with the present invention comprises the steps of detecting a candidate block, which has the highest correlation degree with a coding block in a coding frame picture, from a search area within a reference frame picture; determining that a motion vector which corresponds to the candidate block is a best motion vector; and when there are a plurality of candidate blocks having the highest correlation degree with the coding block within the search area, calculating the difference between each of a plurality of motion vectors corresponding to the plurality of candidate blocks and a best motion vector which is variable-coded immediately before a best motion vector which is being determined, and selecting a best motion vector from among the plurality of motion vectors, based on the calculated difference.

According to the above-mentioned motion vector detection method, when there are a plurality of candidate blocks having the highest correlation degree with the coding block within the search area, a difference is calculated between each of a plurality of motion vectors corresponding to the plurality of candidate blocks and a best motion vector which is variable-coded immediately before a best motion vector which is being determined. Based on the calculated difference, the best motion vector is selected from among the plurality of motion vectors. Therefore, when the variable coding of a motion vector string is conducted by variable-coding the difference between two consecutive motion vectors, a motion vector is selected so that the code length of the motion vector string which has been variable-coded becomes short. As a result, an efficient picture compression processing can be realized.

A motion vector detection apparatus in accordance with the present invention comprises a correlation degree calculation unit for calculating a correlation degree between each candidate block in a search area within a reference frame picture and a coding block in a coding frame picture; and a best motion vector determination unit for determining that a motion vector which corresponds to a candidate block having the highest correlation degree with the coding block is a best motion vector, based on the calculation results obtained by the correlation degree calculation unit.

The best motion vector determination unit includes a motion vector selection unit for selecting one motion vector from among a plurality of motion vectors entered. In determining a best motion vector, when there are a plurality of candidate blocks having the same correlation degree, the motion vector selection unit selects, by the motion vector selection unit, one motion vector from a plurality of motion vectors corresponding to the plurality of candidate blocks, respectively. The motion vector selection unit includes a motion vector encoder for converting a motion vector into a variable code based on a predetermined coding system, converting the plurality of motion vectors into variable codes by the motion vector encoder, and selecting, as the above-mentioned one motion vector, a motion vector whose variable code obtained as a result of conversion has the shortest code length from among the plurality of motion vectors.

According to the above-mentioned motion vector detection apparatus, the plurality of motion vectors having the same correlation degree are converted into variable codes by the motion vector encoder, based on the predetermined coding system used for actual transmission or another system. The motion vector whose variable code obtained as a result of conversion has the shortest code length is selected as the above-mentioned motion vector. Therefore, when there are a plurality of candidate blocks having the highest correlation degree with the coding block within the search area, the motion vector whose variable code obtained as a result of conversion in actual transmission has the shortest code length is selected from among the plurality of motion vectors corresponding to the candidate blocks, respectively. As a result, the code length of the motion vector string which has been variable-coded becomes short, which allows an efficient picture compression processing to be always realized.

Another motion vector detection apparatus in accordance with the present invention comprises a correlation degree calculation unit for calculating a correlation degree between each candidate block in a search area within a reference frame picture and a coding block in a coding frame picture; and a best motion vector determination unit for determining that a motion vector which corresponds to a candidate block having the highest correlation degree with the coding block is a best motion vector, based on calculation results obtained by the correlation degree calculation unit. The best motion vector determination unit includes a motion vector selection unit for selecting one motion vector from among a plurality of motion vectors entered. In determining a best motion vector, when there are a plurality of candidate blocks having the same correlation degree, the best motion vector selects, by the motion vector selection unit, one motion vector from a plurality of motion vectors corresponding to the plurality of candidate blocks, respectively. The motion vector selection unit uses the largest one of absolute values of components of a motion vector as a selection index, and selects, as the above-mentioned one motion vector, a motion vector having the smallest selection index from among the plurality of motion vectors entered.

According to the above-mentioned motion vector detection apparatus, the motion vector selection unit selects, as the above-mentioned motion vector, the motion vector whose largest absolute value for its components, which is the selection index, is the smallest of the plurality of motion vectors having the same correlation degree. Therefore, when there are a plurality of candidate blocks having the highest correlation degree with the coding block within the search area, the motion vector whose largest absolute value for its components, which is the selection index, is the smallest is selected as the best motion vector from among the plurality of motion vectors corresponding to these candidate blocks, respectively.

Another motion vector detection apparatus in accordance with the present invention comprises a correlation degree calculation unit for calculating a correlation degree between each candidate block in a search area within a reference frame picture and a coding block in a coding frame picture; and a best motion vector determination unit for determining that a motion vector which corresponds to a candidate block having the highest correlation degree with the coding block is a best motion vector, based on calculation results obtained by the correlation degree calculation unit. The best motion vector determination unit includes a motion vector selection unit for selecting one motion vector from among a plurality of motion vectors entered. In determining a best motion vector, when there are a plurality of candidate blocks having the same correlation degree, the motion vector selection unit selects, by the motion vector selection unit, one motion vector from a plurality of motion vectors corresponding to the plurality of candidate blocks, respectively. The motion vector selection unit calculates the difference between each of the plurality of motion vectors entered and a best motion vector which is variable-coded immediately before a best motion vector which is being determined, and selects one motion vector from among the plurality of motion vectors entered, based on the calculated difference.

According to the above-mentioned motion vector detection apparatus, a difference is calculated between each of the plurality of motion vectors entered and the best motion vector which is variable-coded immediately before the best motion vector which is being determined. Based on the difference calculated, the best motion vector is selected from among the plurality of motion vectors. Therefore, when the variable coding of a motion vector string is conducted by variable-coding the difference between two consecutive motion vectors, a motion vector is selected so that the code length of the motion vector string which has been variable-coded becomes short. As a result, an efficient picture compression processing can be realized.

BRIEF DESCRIPTION OF THE DRAWINGS

FIG. 5 is a diagram illustrating the priority in motion vector detection in accordance with the second embodiment of the present invention.

FIG. 7 is a diagram illustrating the priority in motion vector detection in accordance with the third embodiment of the present invention.

FIG. 12 is an example of the priority in a motion vector detection in accordance with a conventional method.

DETAILED DESCRIPTION OF THE INVENTION

EMBODIMENT 1

Figure 1:
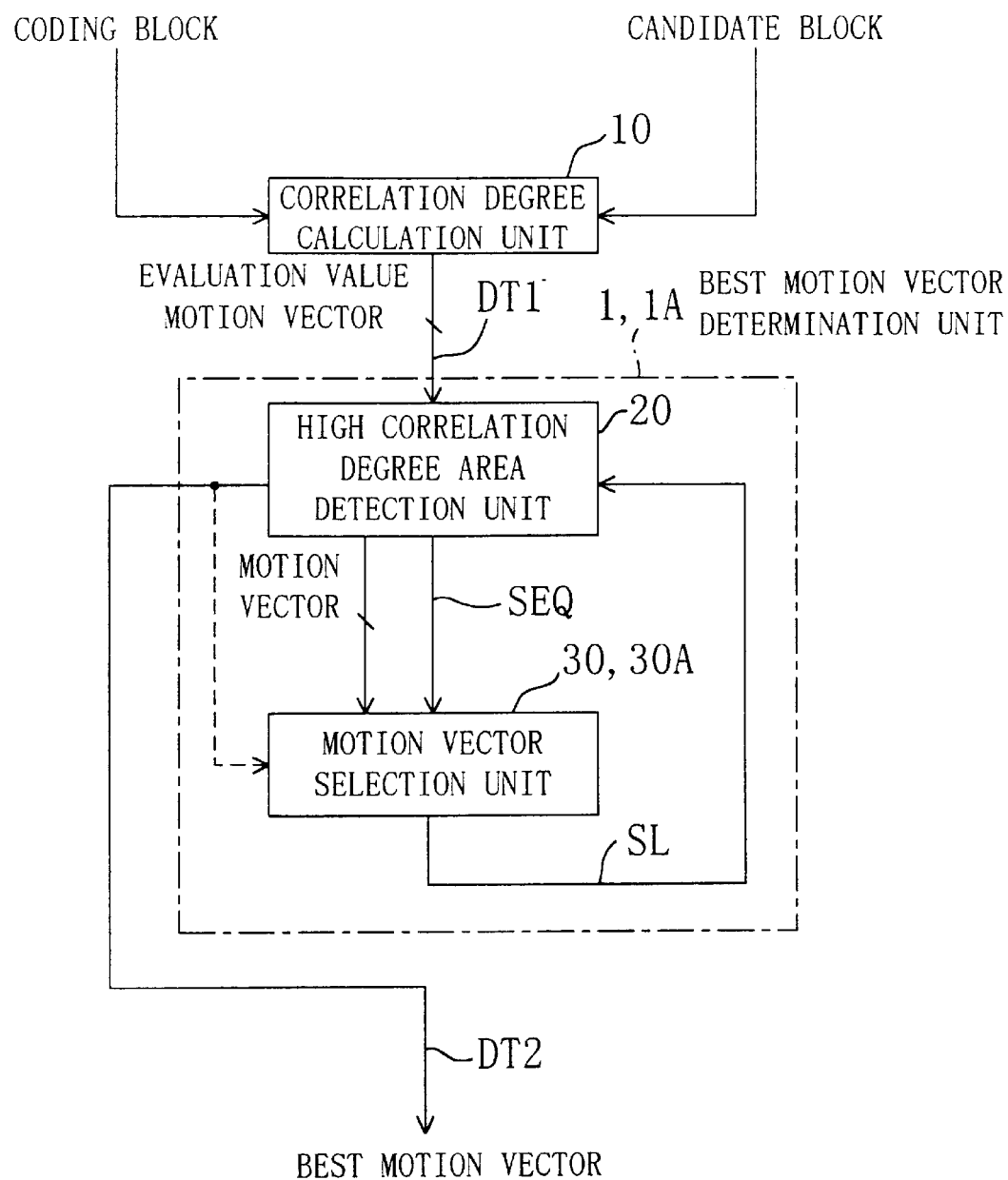
FIG. 1 is a block diagram illustrating the overall construction of a motion vector detection apparatus in accordance with the present invention.
Figure 11:
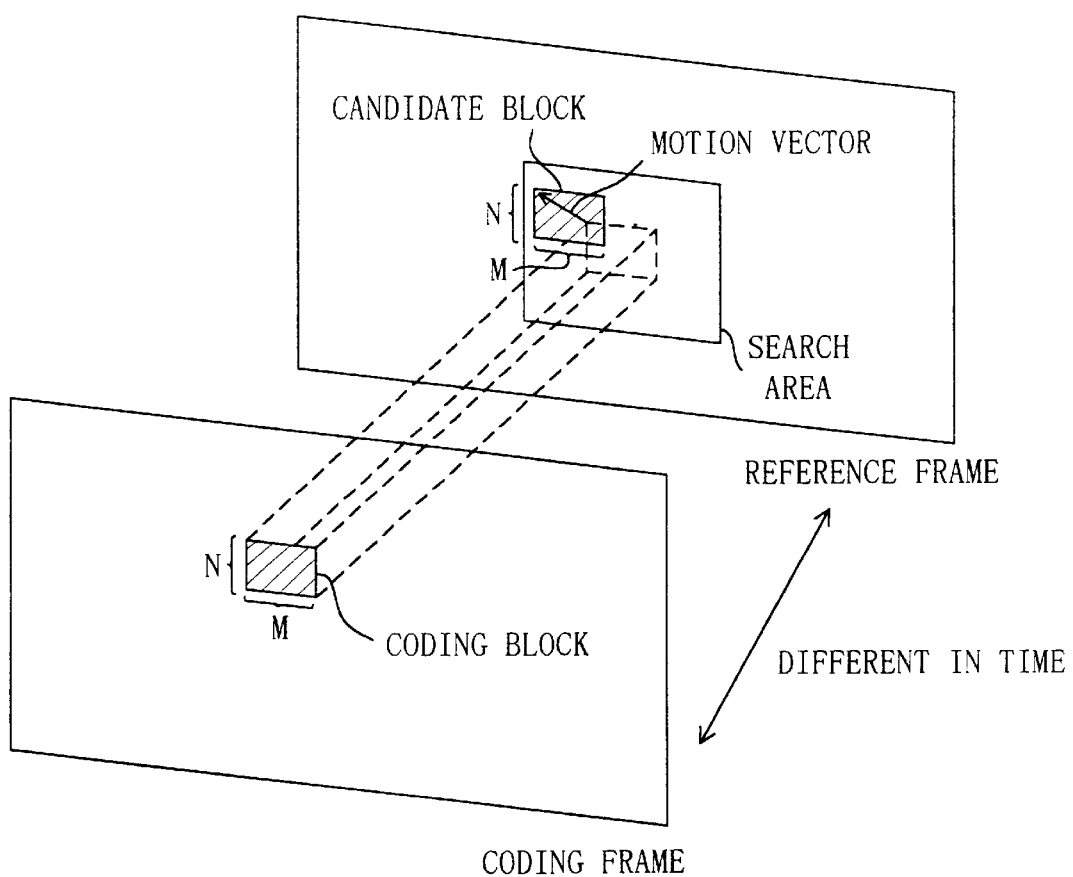
FIG. 11 is a diagram illustrating a block matching method.

FIG. 1 is a block diagram illustrating the rough construction of a motion vector detection apparatus in accordance with the present invention, which detects motion vectors by a block matching method shown in FIG. 11. In FIG. 1, the correlation degree calculation unit 10 enters a coding block and a candidate block, determines the evaluation value of the correlation degree between the coding block and the candidate block (for example, the sum of the absolute values of the difference or the sum of the square of the difference between corresponding pixel data), and outputs the determined evaluation value to the data line DT1. In order to perform the block matching shown in FIG. 11, the correlation degree calculation unit 10 enters one coding block within the coding frame picture and a plurality of candidate blocks which belong in a search area within the reference frame picture, and sequentially determines the evaluation value of the correlation degree between the coding block and each of the candidate blocks. When outputting the evaluation value of the correlation degree between the coding block and each candidate block, the correlation degree calculation unit 10 also outputs the motion vector corresponding to the evaluation value to the data line DT1.

A best motion vector determination unit 1 comprises a high correlation degree area detection unit 20 and a motion vector selection unit 30. The high correlation degree area detection unit 20 detects the candidate block having the smallest evaluation value which has been entered via the data line DT1, and outputs the motion vector corresponding to the detected candidate block as the best motion vector to the data line DT2. When the high correlation degree area detection unit 20 has detected a plurality of candidate blocks having the same evaluation value of the correlation degree, the motion vector selection unit 30 selects one from among a plurality of motion vectors corresponding to these candidate blocks.

In the fourth and fifth embodiments which will be described later, the motion vector detection apparatus comprises a best motion vector determination unit 1A which includes a high correlation degree area detection unit 20 and a motion vector selection unit 30A. The motion vector selection unit 30A enters the best motion vector which has been outputted from the high correlation degree area detection unit 20 to the data line DT2.

The correlation degree calculation unit 10 and the best motion vector determination unit 1 or 1A compose a determination means.

Figure 2:
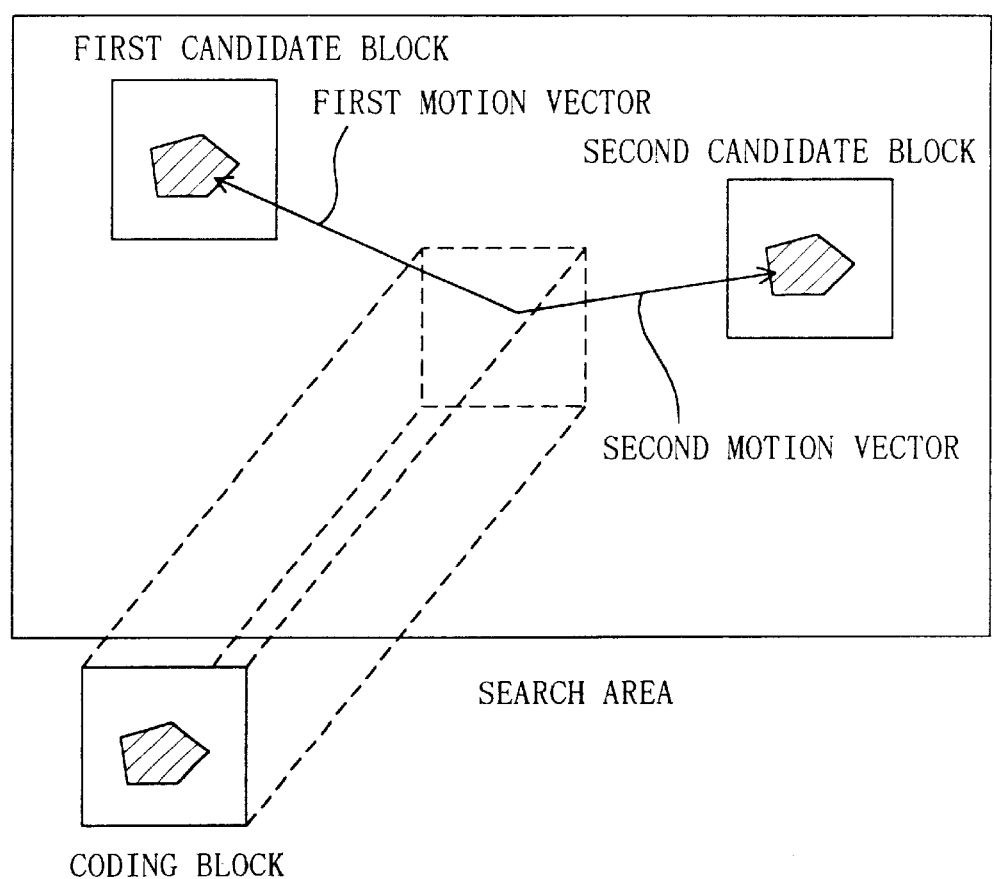
FIG. 2 is a diagram illustrating a case of the subject of the present invention where a plurality of candidate blocks having the same evaluation value of the correlation degree have been detected in a block matching.

FIG. 2 shows a case where a plurality of candidate blocks having the same correlation degree with one coding block have been detected. As shown in FIG. 2, when the first candidate block and the second candidate block which have the same evaluation value of the correlation degree exist within the search area, it is necessary to select between the first motion vector corresponding to the first candidate block and the second motion vector corresponding to the second candidate block.

Figure 3:
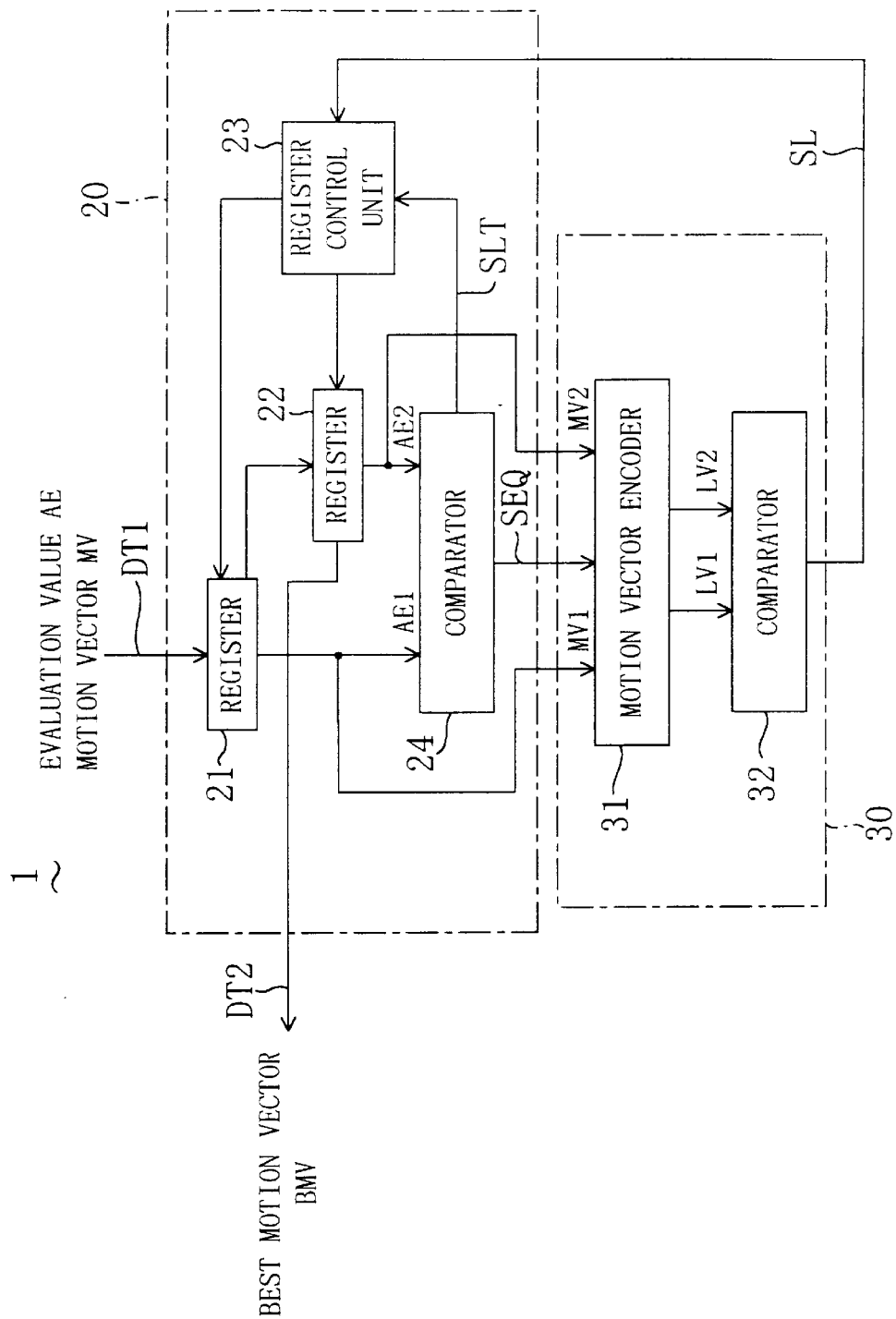
FIG. 3 is a block diagram illustrating the construction of the best motion vector determination unit 1 in a motion vector detection apparatus in accordance with the first embodiment of the present invention.

FIG. 3 is a block diagram illustrating the detailed construction of the best motion vector determination unit 1 in the motion vector detection apparatus in accordance with the first embodiment of the present invention. In FIG. 3 the high correlation degree area detection unit 20 is composed of registers 21 and 22, a register control unit 23, and a comparator 24, whereas the motion vector selection unit 30 is composed of a motion vector encoder 31 and a comparator 32.

The register 21 serially enters the evaluation value AE of the correlation degree between the coding block and a candidate block, and the motion vector (each component of the motion vector) MV corresponding to the candidate block via the data line DT1, and holds the entered evaluation value AE and motion vector MV as an evaluation value AE1 as a comparison target and motion vector MV1 corresponding to the evaluation value AE1. The register 22 holds the evaluation value AE2 which is the smallest ever entered for one coding block and the motion vector MV2 corresponding to the evaluation value AE2 under the control of the register control unit 23 as will be described later.

The comparator 24 compares the sizes of the evaluation value AE1 held in the register 21 and the evaluation value AE2 held in the register 22. The comparator 24 asserts the signal line SLT when the evaluation value AE1 held in the register 21 is smaller than the AE2 held in the register 22, and asserts the signal line SEQ when the AE1 held in the register 21 and the AE2 held in the register 22 are equal (for example, the case shown in FIG. 2).

When the signal line SEQ is asserted, the motion vector encoder 31 variable-codes the entered motion vectors MV1 and MV2, based on a predetermined coding system, and outputs code lengths LV1 and LV2 which correspond to the variable-coded motion vectors MV1 and MV2, respectively. The predetermined coding system can be a system which is used for actual motion vector transmission, or a pseudo system. For example, a motion vector whose components have large values is given long code length, whereas a motion vector whose components have small values is given a short code length.

The comparator 32 compares the sizes of the code lengths LV1 and LV2 outputted from the motion vector encoder 31. When the code length LV1 of the motion vector MV1 is shorter than the code length LV2 of the motion vector MV2, the comparator 32 asserts the signal line SL.

The following is a description of the flow of the process of the best motion vector determination unit 1 in the motion vector detection apparatus in accordance with the present embodiment shown in FIG. 3.

The comparator 24 compares the sizes of the evaluation values AE1 and AE2 held in the registers 21 and 22, respectively. Based on the comparison results, the smallest evaluation value AE2 and the motion vector MV2 which are held in the register 22 are updated as shown in the following (i)–(iii).

(i) When the evaluation value AE held in the register 21 is larger than the smallest evaluation value AE2 held in the register 22, neither the signal line SLT nor the signal line SL is asserted, the register 21 stores the evaluation value AE and the motion vector MV for the next candidate block as the evaluation value AE1 and the motion vector MV1, and the register 22 keeps holding the smallest evaluation value AE2 and the motion vector MV2 which are already stored.

(ii) When the evaluation value AE1 held in the register 21 is smaller than the smallest evaluation value AE2 held in the register 22, the signal line SLT is asserted and the register control unit 23 updates the smallest evaluation value AE2 and the motion vector MV2 held in the register 22 to the evaluation value AE1 and the motion vector MV1 held in the register 21.

(iii) When the evaluation value AE1 held in the register 21 and the smallest evaluation value AE2 held in the register 22 are equal, the signal line SEQ is asserted, the motion vector encoder 31 variable-codes the motion vectors MV1 and MV2, and the comparator 32 compares the sizes of the code lengths LV1 and LV2 of the motion vectors MV1 and MV2. When the code length LV1 of the motion vector MV1 is smaller, the signal line SL is asserted and the register control unit 23 updates the smallest evaluation value AE2 and the motion vector MV2 held in the register 22 to the evaluation value AE1 and the motion vector MV1 held in the register 21. Otherwise, the signal line SL is not asserted, the register 21 stores the evaluation value AE and the motion vector MV for the next candidate block as the evaluation value AE1 and the motion vector MV1, and the register 22 keeps holding the smallest evaluation value AE2 and the motion vector MV2 which are already stored.

When the block matching process for all the candidate blocks has been completed by repeating the above-mentioned process, the motion vector MV2 held in the register 22 is outputted as the best motion vector via the data line DT2.

As described hereinbefore, according to the present embodiment, when the high correlation degree area detection unit 20 has detected a plurality of candidate blocks having the same evaluation value of the correlation degree, the motion vector selection unit 30 selects from among a plurality of motion vectors corresponding to these candidate blocks the motion vector having the shortest code length when it is variable-coded based on a predetermined coding system. Thus, when there are a plurality of candidate blocks which have the highest correlation degree with the coding block in a search area, the motion vector which has the shortest code length when it is variable-coded based on a predetermined coding system is selected, as the best motion vector, from among a plurality of motion vectors corresponding to these candidate blocks. This enables the best motion vector string to have a shorter code length when it is variable-coded, which realizes a more efficient picture compression than ever.

EMBODIMENT 2

The second embodiment of the present invention has a feature that the motion vector selection unit 30 shown in FIG. 1 selects a motion vector by using the bigger one of the absolute values of the horizontal and vertical components of a motion vector as a selection index, instead of performing the variable coding of a motion vector.

Figure 4:
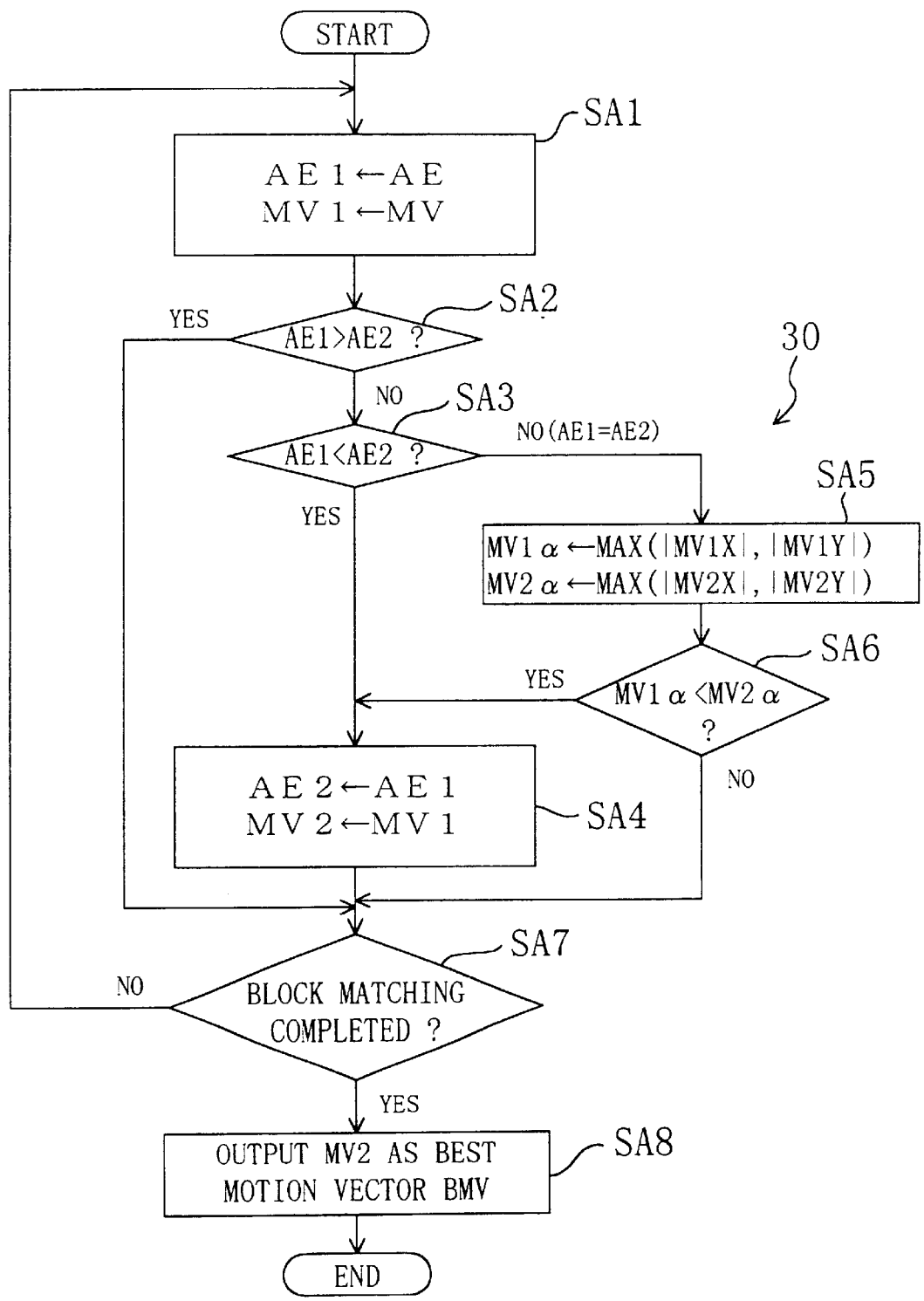
FIG. 4 is a flowchart illustrating the flow of a motion vector detection process in accordance with the second embodiment of the present invention.

FIG. 4 is a flowchart illustrating the flow of a motion vector detection process in accordance with the second embodiment of the present invention, which shows the operation of the best motion vector determination unit 1 in accordance with the present embodiment. The present embodiment will be described with reference to FIG. 4.

The high correlation degree area detection unit 20 enters the evaluation value AE and the motion vector MV from the correlation degree calculation unit 10 and regards them as the evaluation value AE1 for a comparison target and the motion vector MV1 (step SA1). The sizes of the evaluation value AE1 for the comparison target and the evaluation value AE2 which is the smallest in the process so far are compared (steps SA2 and SA3). When the evaluation value AE1 for the comparison target is larger (step SA2), the input of the next evaluation value AE and the motion vector MV is waited. On the other hand, when the evaluation value AE1 is smaller (step SA3), it is determined that the motion vector MV1 is the best motion vector ever entered, and the smallest evaluation value AE2 and the motion vector MV2 are updated to the evaluation value AE1 for the comparison target and the motion vector MV1 (step SA4).

When the evaluation value AE1 for the comparison target and the smallest evaluation value AE2 are equal, the motion vector selection unit 30 finds, as selection indexes, a value MV1 α which is the bigger of the absolute value of the horizontal component MV1X and the absolute value of the vertical component MV1Y of the motion vector MV1, and a value MV2α which is the bigger of the absolute value of the horizontal component MV2X and the absolute value of the vertical component MV2Y of the motion vector MV2 (step SA5), so as to compare the sizes of MV1α and MV2α (step SA6). When MV1α is smaller, it is determined that the motion vector MV1 is the best motion vector ever entered, and based on this determination, the high correlation degree area detection unit 20 updates the smallest evaluation value AE2 and the motion vector MV2 to the evaluation value AE1 for the comparison target and the motion vector MV1 (step SA4). Otherwise, the high correlation degree area detection unit 20 waits for the next evaluation value AE and motion vector MV to be entered.

After the completion of the block matching (step SA7), the motion vector MV2 corresponding to the smallest AE2 is outputted as the best motion vector BMV (step SA8).

FIG. 5 is a diagram illustrating an example of the priority values of motion vectors which are determined as the result of the motion vector detection in accordance with the present embodiment shown in FIG. 4. In FIG. 5 the numbers at the top and leftmost respectively indicate the horizontal and vertical components of motion vectors. The number in each square indicates priority assigned to a motion vector whose horizontal and vertical components are respectively shown at the top and leftmost, with priority increasing in ascending order of numbers. In FIG. 5, the horizontal and vertical components range between −3 and 3; however the priority values can be set in a wider range. In addition, the horizontal and vertical components can be other than integers.

When the evaluation value for the motion vector (2, 3) and the evaluation value for the motion vector (2, 1) are equal, according to the priority values shown in FIG. 5, the priority assigned to the motion vector (2, 3) is 1 whereas the priority assigned to the motion vector (2, 1) is 2. As a result, the motion vector (2, 1) having a higher priority is selected as the best motion vector. Thus, in the present embodiment the selection index for the motion vector (2, 3) is the absolute value of the vertical component, that is, 3 and the selection index for the motion vector (2, 1) is the absolute value of the horizontal component, that is, 2. Consequently, the motion vector (2, 1) having the smaller selection index is selected as the best motion vector.

EMBODIMENT 3

The third embodiment of the present invention is a combination of the motion vector detection in accordance with the second embodiment and a process performed when the selection index, which is the bigger of the absolute values of the horizontal and vertical components, of a motion vector is equal to the selection index of another motion vector.

Figure 6:
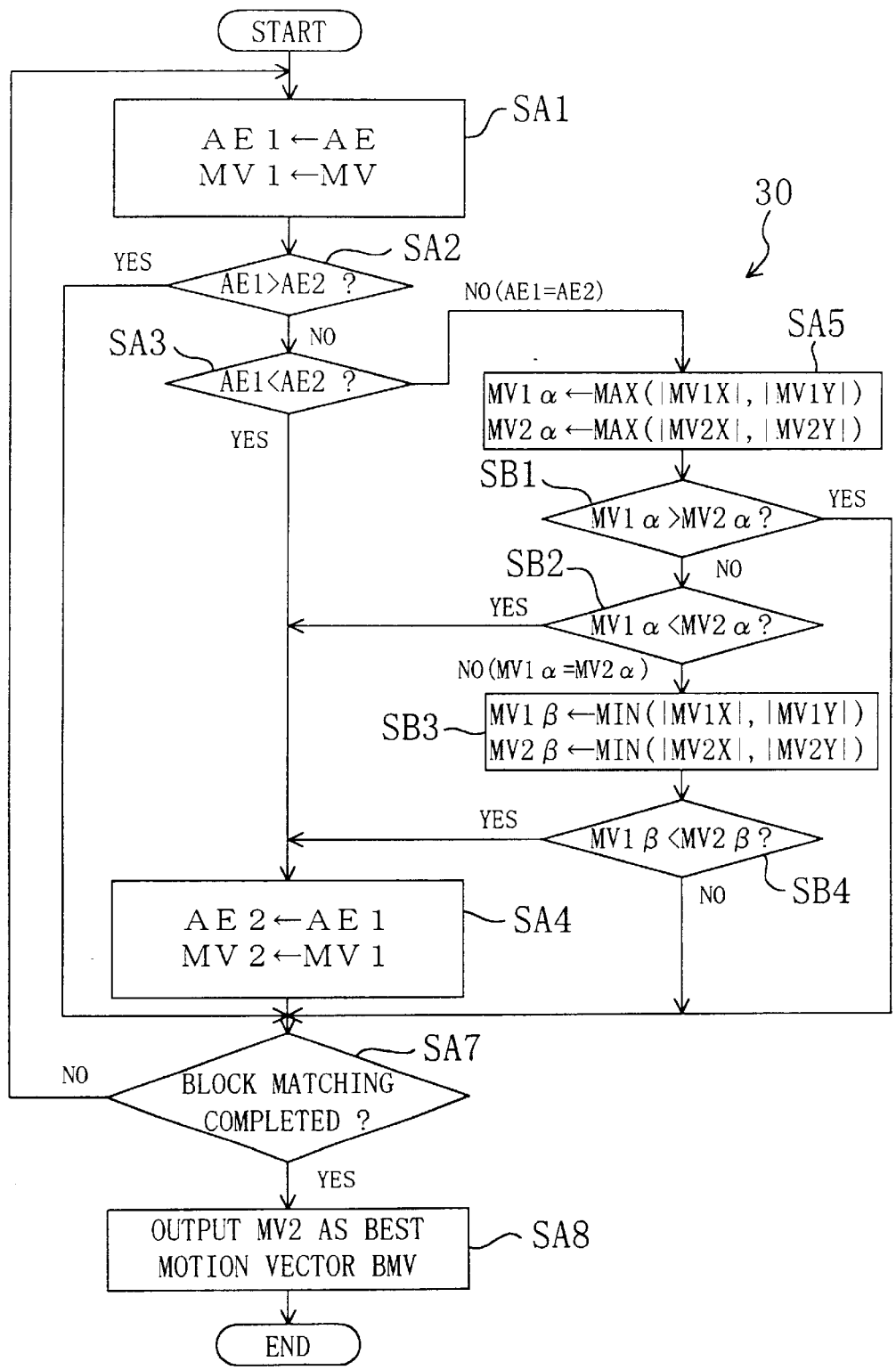
FIG. 6 is a flowchart illustrating the flow of a motion vector detection process in accordance with the third embodiment of the present invention.

FIG. 6 is a flowchart illustrating the flow of a motion vector detection process in accordance with the third embodiment of the present invention, which shows the operation of the best motion vector determination unit 1 in accordance with the present embodiment. The present embodiment has steps SB1–SB4 in place of the step SA6 shown in FIG. 4 in accordance with the second embodiment, thereby being different from the second embodiment only in the process for the case where the evaluation values AE1 and AE2 are equal. The present embodiment will be described as follows with reference to FIG. 6.

When the evaluation value AE1 for the comparison target and the smallest evaluation value AE2 are equal, the motion vector selection unit 30 selects, as selection indexes, a value MV1α which is the bigger of the absolute values of the horizontal component MV1X and the vertical component MV1Y of the motion vector MV1, and a value MV2α which is the bigger of the absolute values of the horizontal component MV2X and the vertical component MV2Y of the motion vector MV2 in the same manner as in the second embodiment (step SA5), so as to compare the sizes of MV1α and MV2α (steps SB1 and SB2). When MV1α is bigger (step SB1), the high correlation degree area detection unit 20 waits for the next evaluation value AE and motion vector MV to be entered. On the other hand, when MV1α is smaller (step SB2), it is determined that the motion vector MV1 is the best motion vector ever entered, and based on this determination, the high correlation degree area detection unit 20 updates the smallest evaluation value AE2 and the motion vector MV2 to the evaluation value AE1 for the comparison target and the motion vector MV1 (step SA4).

When MV1α and MV2α are equal, the motion vector selection unit 30 finds, as new selection indexes, a value MV1β (not MV1 a) which is the smaller of the absolute values of the horizontal component MV1X and the vertical component MV1Y of the motion vector MV1, and a value MV2β (not MV2α) which is the smaller of the absolute values of the horizontal component MV2X and the vertical component MV2Y of the motion vector MV2 (step SB3), so as to compare the sizes of MV1β and MV2β (step SB4). When MV1β is smaller, it is determined that the motion vector MV1 is the best motion vector ever entered, and based on this determination, the high correlation degree area detection unit 20 updates the smallest evaluation value AE2 and the motion vector MV2 to the evaluation value AE1 for the comparison target and the motion vector MV1 (step SA4). Otherwise, the high correlation degree area detection unit 20 waits for the next evaluation value AE and motion vector MV to be entered.

After the completion of the block matching (step SA7), the motion vector MV2 which corresponds to the smallest evaluation value AE2 is outputted as the best motion vector BMV (step SA8).

FIG. 7 is a diagram illustrating an example of the priority values of motion vectors which are determined as the result of the motion vector detection in accordance with the present embodiment shown in FIG. 6. In FIG. 7 the numbers at the top and leftmost respectively indicate the horizontal and vertical components of motion vectors. The number in each square indicates priority assigned to a motion vector whose horizontal and vertical components are respectively shown at the top and leftmost, with priority increasing in ascending order of numbers. In FIG. 7, the horizontal and vertical components range between −3 and 3; however the priority values can be set in a wider range. In addition, the horizontal and vertical components can be other than integers.

When the evaluation value for the motion vector (2, 3) and the evaluation value for the motion vector (3, −1) are equal, according to the priority values shown in FIG. 5 in accordance with the second embodiment, both the motion vector (2, 3) and the motion vector (3, −1) are assigned priority 1. Therefore, it cannot be determined which of these motion vectors should be selected as the best motion vector.

In contrast, according to the priority values shown in FIG. 7 in accordance with the present embodiment, the priority assigned to the motion vector (2, 3) is 2 and the priority assigned to the motion vector (3, −1) is 3, so that the motion vector (3, −1) having the higher priority is selected as the best motion vector. Thus, according to the present embodiment, both the motion vectors (2, 3) and (3, −1) have the selection index of 3; however, the new selection index for the motion vector (2, 3) is the absolute value of the horizontal component, that is, 2, whereas the new selection index for the motion vector (3, −1) is the absolute value of the vertical component, that is, 1. As a result, the motion vector (3, −1) having the smaller new selection index is selected as the best motion vector.

As described hereinbefore, the present embodiment provides a more minute setting of priority for motion vectors than the second embodiment. When a plurality of motion vectors have the same evaluation value and the same priority in accordance with the present embodiment, any of them can be selected as the best motion vector based on a certain index.

EMBODIMENT 4

Figure 8:
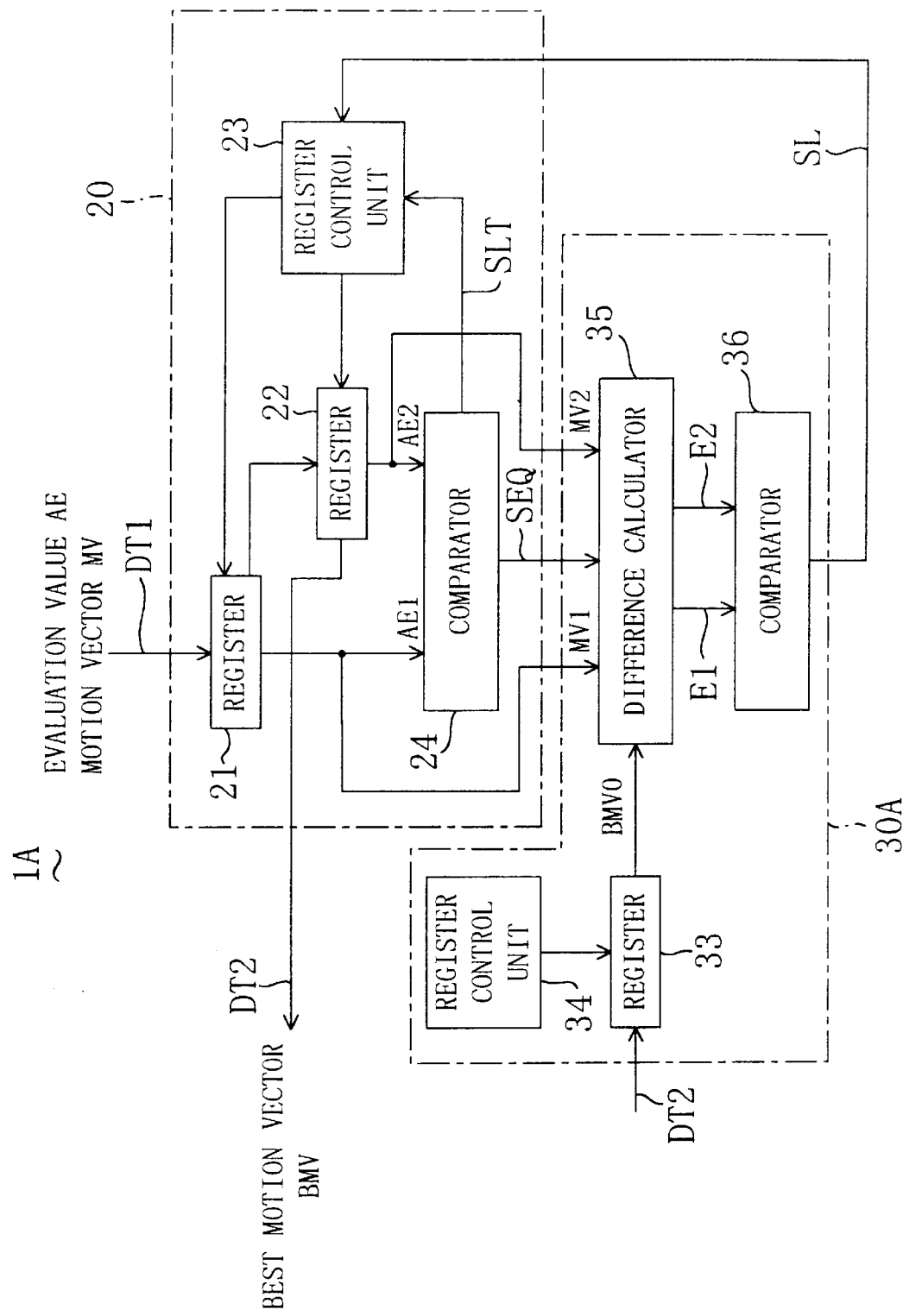
FIG. 8 is a block diagram illustrating the construction of the best motion vector determination unit 1A in a motion vector detection apparatus in accordance with the fourth embodiment of the present invention.

FIG. 8 is a block diagram illustrating the detailed construction of the best motion vector determination unit 1A in a motion vector detection apparatus in accordance with the fourth embodiment of the present invention. In the best motion vector determination unit 1A in accordance with the present embodiment shown in FIG. 8, the high correlation degree area detection unit 20 has the same construction as in the first embodiment shown in FIG. 3; however, different from the motion vector selection unit 30 in accordance with the first embodiment shown in FIG. 3, the motion vector selection unit 30A is composed of a register 33, a register control unit 34, a difference calculator 35, and a comparator 36. In the present embodiment the detailed description of the high correlation degree area detection unit 20 will be omitted.

In the motion vector selection unit 30A, the register 33 is under the control of the register control unit 34, and enters the best motion vector BMV which has been just determined by the best motion vector determination unit 1A, via the data line DT2. In other words, the register 33 stores the best motion vector BMV0 of the coding block which has been processed immediately before the current coding block.

The difference calculator 35 calculates the difference between the best motion vector BMV0 held in the register 33 and each of the motion vectors MV1 and MV2 respectively held in the registers 21 and 22 of the high correlation degree area detection unit 20, and outputs the absolute value of difference E1 between the best motion vector BMV0 and the motion vector MV1 and the absolute value of difference E2 between the best motion vector BMV0 and the motion vector MV2.

The comparator 36 compares the sizes of these absolute values of difference E1 and E2 outputted from the difference calculator 35, and asserts the signal line SL when the absolute value of difference E1 is smaller.

Figure 9:
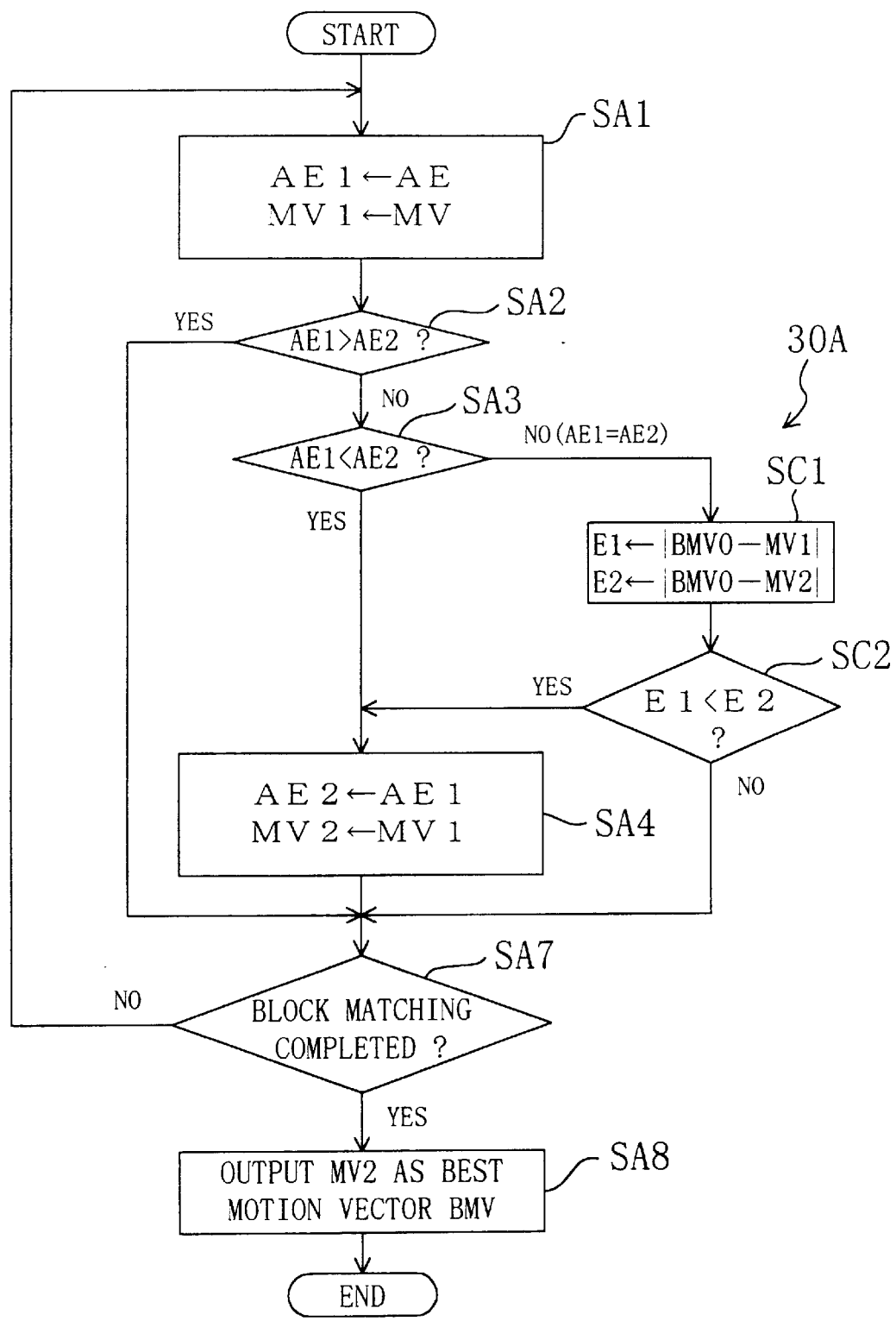
FIG. 9 is a flowchart illustrating the flow of a motion vector detection process in accordance with the fourth embodiment of the present invention.

FIG. 9 is a flowchart illustrating the flow of a motion vector detection process in accordance with the present embodiment, which shows the operation of the best motion vector determination unit 1A in accordance with the present embodiment shown in FIG. 8. The present embodiment has steps SC1–SC4 in place of the steps SA5 and SA6 shown in FIG. 4 in accordance with the second embodiment, thereby being different from the second embodiment only in the process for the case where the evaluation values AE1 and AE2 are equal.

When the evaluation value AE1 for the comparison target and the smallest evaluation value AE2 are equal, the signal line SEQ is asserted and the difference calculator 35 finds the absolute value of difference E1 between the best motion vector BMV0 and the motion vector MV1, and the absolute value of difference E2 between the best motion vector BMV0 and the motion vector MV2 (step SC1), so that the comparator compares the sizes of the absolute values of difference E1 and E2 (step SC2). When the absolute value of difference E1 is smaller, the signal line SL is asserted and the register 22 updates the smallest evaluation value AE2 and the motion vector MV2 held therein to the evaluation value AE1 for the comparison target and the motion vector MV1 under the direction of the register control unit 23 (step SA4). Otherwise, the register 22 does not update the smallest evaluation value AE2 and the motion vector MV2 held therein and the high correlation degree area detection unit 20 waits for the next evaluation value AE and motion vector MV to be entered.

After the completion of the block matching (step SA7), the high correlation degree area detection unit 20 outputs the motion vector MV2 which corresponds to the smallest evaluation value AE2 to the data line DT2 as the best motion vector BMV (step SA8). The best motion vector BMV is newly held in the register 33 and used for the difference calculation in the block matching for the next coding block.

A best motion vector string consisting of the best motion vectors which have been determined by the above-mentioned operation is variable-coded by coding the value of difference between two consecutive best motion vectors. When the motion vectors are compliant with the MPEG standard, a motion vector having a smaller value of difference is given a smaller code amount. Thus, like in the present embodiment, to select a best motion vector having the smaller difference with the immediately preceding best motion vector when the evaluation values are equal makes it possible to determine the best motion vector having the shorter code length as a result of variable coding when a plurality of candidate blocks having the highest correlation degree with the coding block exits within a search area.

In the present embodiment, the difference between the current best motion vector and the best motion vector which has been determined immediately before the current best motion vector is calculated. However, when the order of determining the best motion vector in accordance with the present embodiment is different from the order of variable coding best motion vectors, the best motion vector which is variable-coded immediately before the best motion vector which is being determined may be the target of difference calculation.

EMBODIMENT 5

In the fifth embodiment of the present invention the difference calculator 35 of the motion vector selection unit 30A shown in FIG. 8 finds ER1α which is the bigger of the absolute values ER1X and ER1Y of the difference components of the best motion vector BMV0 and the motion vector MV1, and also finds ER2α which is the bigger of the absolute values ER2X and ER2Y of the difference components of the best motion vector BMV0 and the motion vector MV2, instead of finding the absolute value of difference E1 between the best motion vector BMV0 and the motion vector MV1 and the absolute value of difference E2 between the best motion vector BMV0 and the motion vector MV2. Thus, the fifth embodiment of the present invention uses the bigger of the absolute values of the difference components as the selection index for motion vectors, instead of using the sum of the absolute values of difference as the selection index.

Figure 10:
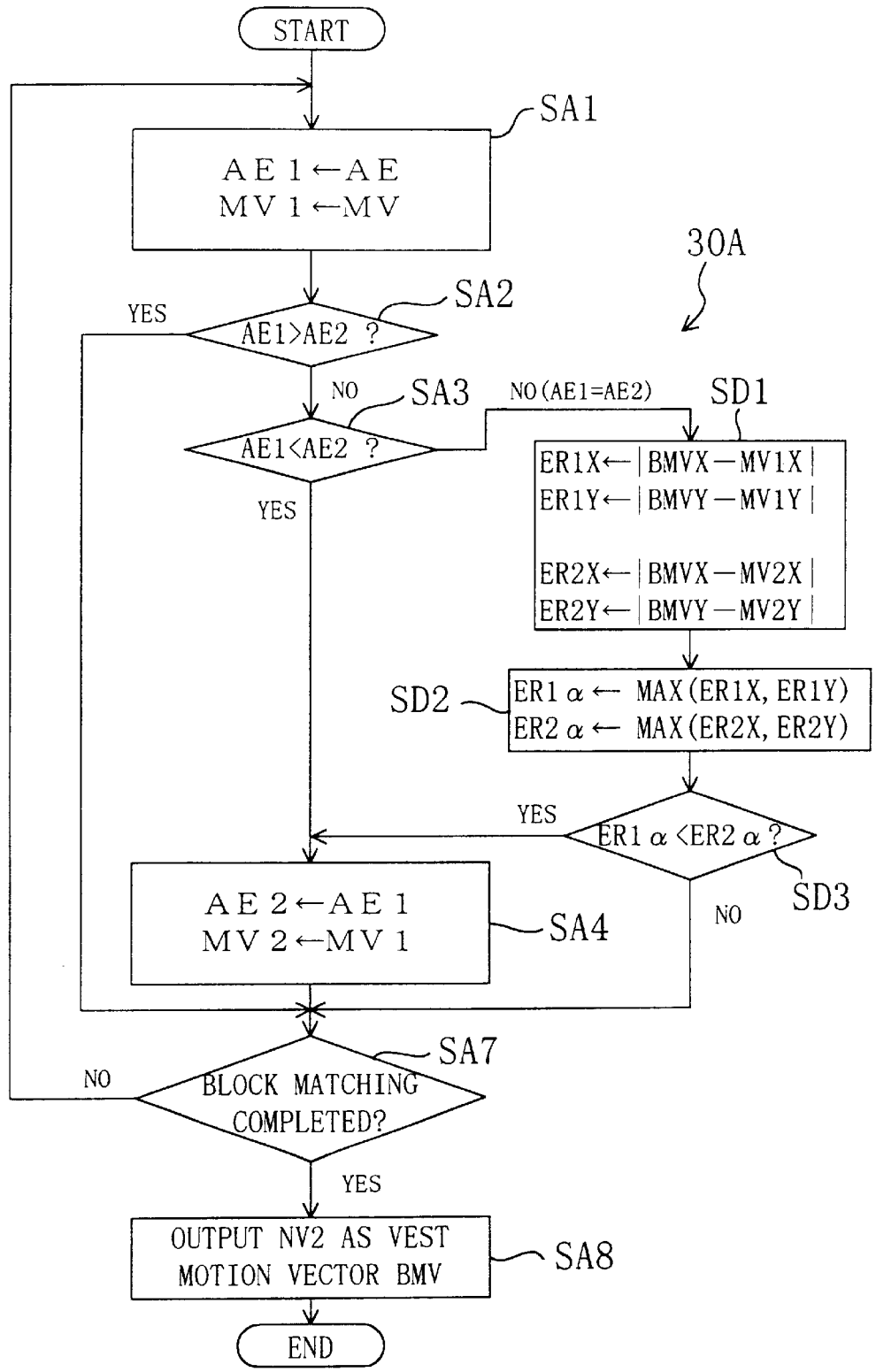
FIG. 10 is a flowchart illustrating the flow of a motion vector detection process in accordance with the fifth embodiment of the present invention.

FIG. 10 is a flowchart illustrating the flow of a motion vector detection process in accordance with the fifth embodiment of the present invention, which shows the operation of the best motion vector determination unit 1A in accordance with the present invention. The present embodiment has steps SD1–SD3 in place of the steps SC1 and SC2 shown in FIG. 9, thereby being different from the second embodiment only in the process for the case where the evaluation values AE1 and AE2 are equal. The present embodiment will be described as follows with reference to FIG. 10.

When the evaluation value AE1 for the comparison target and the smallest evaluation value AE2 are equal, the signal line SEQ is asserted and the difference calculator 35 calculates the absolute values ER1X and ER1Y of the components of the difference between the best motion vector BMV0 and the motion vector MV1, and the absolute values ER2X and ER2Y of the components of the difference between the best motion vector BMV0 and the motion vector MV2 (step SD1). The difference calculator 35 then calculates ER1α which is the bigger of the absolute values ER1X and ER1Y of the components of the difference between the best motion vector BMV0 and the motion vector MV1, and ER2α which is the bigger of the absolute values ER2X and ER2Y of the components of the difference between,the best motion vector BMV0 and the motion vector MV2 (step SD2).

Then, the comparator 36 compares the sizes of ER1α and ER2α (step SD3). When ER1α is smaller, the signal line SL is asserted and the register 22 updates the smallest evaluation value AE2 and the motion vector MV2 held therein to the evaluation value AE1 for the comparison target and the motion vector MV1 under the direction of the register control unit 23 (step SA4). Otherwise, the register 22 does not update the smallest evaluation value AE2 and the motion vector MV2 held therein and the high correlation degree area detection unit 20 waits for the next evaluation value AE and motion vector MV to be entered.

After the completion of the block matching (step SA7), the high correlation degree area detection unit 20 outputs the motion vector MV2 which corresponds to the smallest evaluation value AE2 to the data line DT2 as the best motion vector BMV (step SA8). The best motion vector BMV is newly held in the register 33 and used for the difference calculation in the block matching for the next coding block.

A best motion vector string consisting of the best motion vectors which have been determined by the above-mentioned operation is variable-coded by coding the value of difference between two consecutive best motion vectors. When the motion vectors are compliant with the MPEG standard, a motion vector having a smaller value of difference is given a smaller code amount. Thus, like in the present embodiment, to select a best motion vector having the smaller difference with the immediately preceding best motion vector when the evaluation values are equal makes it possible to determine the best motion vector having the shorter code length as a result of variable coding when a plurality of candidate blocks having the highest correlation degree with the coding block exits within a search area.

In the present embodiment, the difference between the current best motion vector and the best motion vector which has been determined immediately before the current best motion vector is calculated. However, when the order of determining the best motion vector in accordance with the present embodiment is different from the order of variable coding best motion vectors, the best motion vector which is variable-coded immediately before the best motion vector which is being determined may be the target of difference calculation.

In the first through fifth embodiments, the best motion vector is selected by using the motion vector selection unit 30 or 30A while the evaluation value AE and the motion vector MV are sequentially entered into the best motion vector determination unit 1 or 1A. However, the present invention is not restricted to this construction. For example, it is possible to first select a candidate block having the highest correlation degree with a coding block from all the candidate blocks, and when there are a plurality of such candidate blocks, to conduct the same process as those in the motion vector selection units 30 and 30A in accordance with the first through fifth embodiments, so as to select the best motion vector from among a plurality of motion vectors corresponding to these candidate blocks, respectively.

The first through fifth embodiments embody the present invention in a motion vector detection apparatus shown in FIG. 1; however, the present invention can be a motion vector detection algorithm instead. According to this algorithm, a candidate block having the highest correlation degree with a coding block is first selected from all the candidate blocks, and when there are a plurality of such candidate blocks, the same process as those in the motion vector selection units 30 and 30A in accordance with the first through fifth embodiments is conducted, so as to select the best motion vector from among a plurality of motion vectors corresponding to these candidate blocks.

In the second through fifth embodiments, motion vectors have two dimensions, and their vertical and horizontal components are used for the calculation to select a motion vector; however, motion vectors may have N-dimensions (N is a positive integer). For example, when motion vectors have three or more dimensions, the largest one of the absolute values of the components of a motion vector can be the selection index in the second embodiment. In the third embodiment, one of the non-largest absolute values of the components (for example, the second largest absolute value) can be a new selection index.

In the MPEG standard or the like, the processing such as motion vector detection, motion compensation, DCT, quantization, variable coding are executed in serial. The motion vector detection in accordance with the fourth and fifth embodiments allows a motion vector to be selected by taking variable coding into consideration, thereby realizing a highly-efficient coding. However, the motion vector detection in accordance with the fourth and fifth embodiments demands that a standard motion vector for difference calculation is set in advance when a best motion vector is determined. Therefore, the current technical level fails to satisfactorily apply this motion vector detection to a real time processing. On the other hand, the motion vector detection in accordance with the fourth and fifth embodiments is suitable for the motion picture compression apparatus such as a picture editing appliance which requires a high picture quality. In contrast, the motion vector detection in accordance with the second and third embodiments realizes a real time processing which is the problem of the motion vector detection in accordance with the fourth and fifth embodiments, and is suitable for a motion picture compression apparatus which requires a real time processing such as a motion picture camera, a monitor, and the like.

What is claimed is:

1. A motion vector detection apparatus comprising:
   a correlation degree calculation unit for calculating an evaluation value of a correlation degree between each candidate block in a search area within a reference frame picture and a coding block in a coding frame picture, said evaluation value representing the difference between an image content contained in a respective candidate block and an image content contained in said reference frame picture;
   a best motion vector determination unit for determining that a motion vector which corresponds to a candidate block having a highest correlation degree with said coding block is a best motion vector, based on calculation results obtained by said correlation degree calculation unit;
   said best motion vector determination unit including a motion vector selection unit for selecting one motion vector from among a plurality of motion vectors entered, and in determining a best motion vector, when there are a plurality of candidate blocks having equal evaluation values, selecting, by said motion vector selection unit, one motion vector from a plurality of motion vectors corresponding to said plurality of candidate blocks, respectively; and
   said motion vector selection unit calculating a difference between each of said plurality of motion vectors entered and a best motion vector which is variable-coded immediately before a best motion vector which is being determined, and selecting one motion vector from among said plurality of motion vectors entered, based on a calculated difference.

2. The motion vector detection apparatus according to claim 1, wherein said motion vector selection unit comprises:
   a storage means for storing a best motion vector which is variable-coded immediately before a best motion vector being determined and which has been determined by said best motion vector determination unit;
   a difference calculator for calculating a difference between each of said plurality of motion vectors entered in said motion vector selection unit and the best motion vector stored in said storage means; and
   said motion vector selection unit selecting said one motion vector from among said plurality of motion vectors entered, based on the difference calculated by said difference calculator.

* * * * *